US010766789B2

(12) United States Patent
Song et al.

(10) Patent No.: US 10,766,789 B2
(45) Date of Patent: Sep. 8, 2020

(54) SYSTEM FOR FLUE-GAS HYDRATE-BASED DESALINATION USING LNG COLD ENERGY

(71) Applicant: Dalian University of Technology, Dalian, Liaoning Province (CN)

(72) Inventors: Yongchen Song, Dalian (CN); Jianan Zheng, Dalian (CN); Mingjun Yang, Dalian (CN); Weiguo Liu, Dalian (CN); Jiafei Zhao, Dalian (CN); Yi Zhang, Dalian (CN)

(73) Assignee: DALIAN UNIVERSITY OF TECHNOLOGY, Dalian, Liaoning (CN)

(*) Notice: Subject to any disclaimer, the term of this patent is extended or adjusted under 35 U.S.C. 154(b) by 235 days.

(21) Appl. No.: 16/075,762

(22) PCT Filed: Dec. 17, 2016

(86) PCT No.: PCT/CN2016/110553
§ 371 (c)(1),
(2) Date: Aug. 6, 2018

(87) PCT Pub. No.: WO2018/103133
PCT Pub. Date: Jun. 14, 2018

(65) Prior Publication Data
US 2019/0039916 A1    Feb. 7, 2019

(30) Foreign Application Priority Data
Dec. 7, 2016 (CN) .......................... 2016 1 1116953

(51) Int. Cl.
*C02F 1/22* (2006.01)
*C10L 3/10* (2006.01)
(Continued)

(52) U.S. Cl.
CPC ................ *C02F 1/22* (2013.01); *C02F 1/265* (2013.01); *C10L 3/104* (2013.01); *C10L 3/108* (2013.01);
(Continued)

(58) Field of Classification Search
CPC ....................................................... C02F 1/22
See application file for complete search history.

(56) References Cited

U.S. PATENT DOCUMENTS

| 6,565,715 | B1 | 5/2003 | Max | |
|---|---|---|---|---|
| 2014/0158635 | A1* | 6/2014 | Katyal | C02F 1/5236 210/742 |

FOREIGN PATENT DOCUMENTS

| CN | 103861444 A | 6/2014 |
|---|---|---|
| CN | 103991985 A | 8/2014 |

(Continued)

*Primary Examiner* — Peter Keyworth
(74) *Attorney, Agent, or Firm* — Muncy, Geissler, Olds & Lowe, P.C.

(57) ABSTRACT

A system for flue-gas hydrate-based desalination using LNG cold energy belongs to the field of hydrate technology application. The $CO_2$ in the flue-gas is captured based on the hydrate formation. Two stage formation chambers are set to improve the hydrate formation. The two steps to purify the hydrates respectively are the gas separation and the liquid separation. The two methods of hydrate dissociation to realize the recycling of the waste heat of flue-gas and the $CO_2$ are the heat-exchanged and the exhausted. The present invention realizes the integrated $CO_2$ capture and seawater desalination with a proper structure and a subtle system and solves the cold energy source for hydrate-based desalination by means of using LNG cold energy. The two stage formation chambers solve the capture of $CO_2$ in the flue-gas and guarantee the hydrate formation amounts. The two types of dissociation chambers decrease the heat emission by using the waste heat of flue-gas and realize the recycling and (Continued)

(Fig.2 as an illustration in Abstract)

storage of $CO_2$. The system will not be affected by the changes of seasons and environments and has a strong carrying capacity for the flue-gas source change. It is a system with great application value realistic.

1 Claim, 1 Drawing Sheet

(51) Int. Cl.
*C02F 1/26* (2006.01)
*C02F 1/20* (2006.01)
*C02F 101/10* (2006.01)
*C02F 103/08* (2006.01)

(52) U.S. Cl.
CPC ............ *C02F 1/20* (2013.01); *C02F 2101/10* (2013.01); *C02F 2103/08* (2013.01); *C02F 2201/005* (2013.01); *C02F 2209/04* (2013.01); *C02F 2301/06* (2013.01); *C02F 2301/10* (2013.01)

(56) References Cited

FOREIGN PATENT DOCUMENTS

| | | |
|---|---|---|
| CN | 105688630 A | 6/2016 |
| WO | WO 03068685 A1 | 8/2003 |
| WO | WO 2013076737 A1 | 5/2013 |

\* cited by examiner

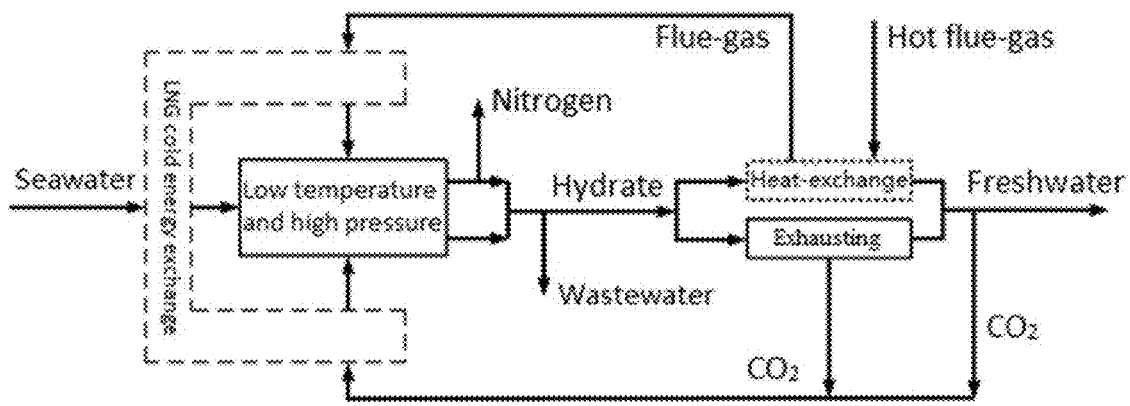
Fig.1
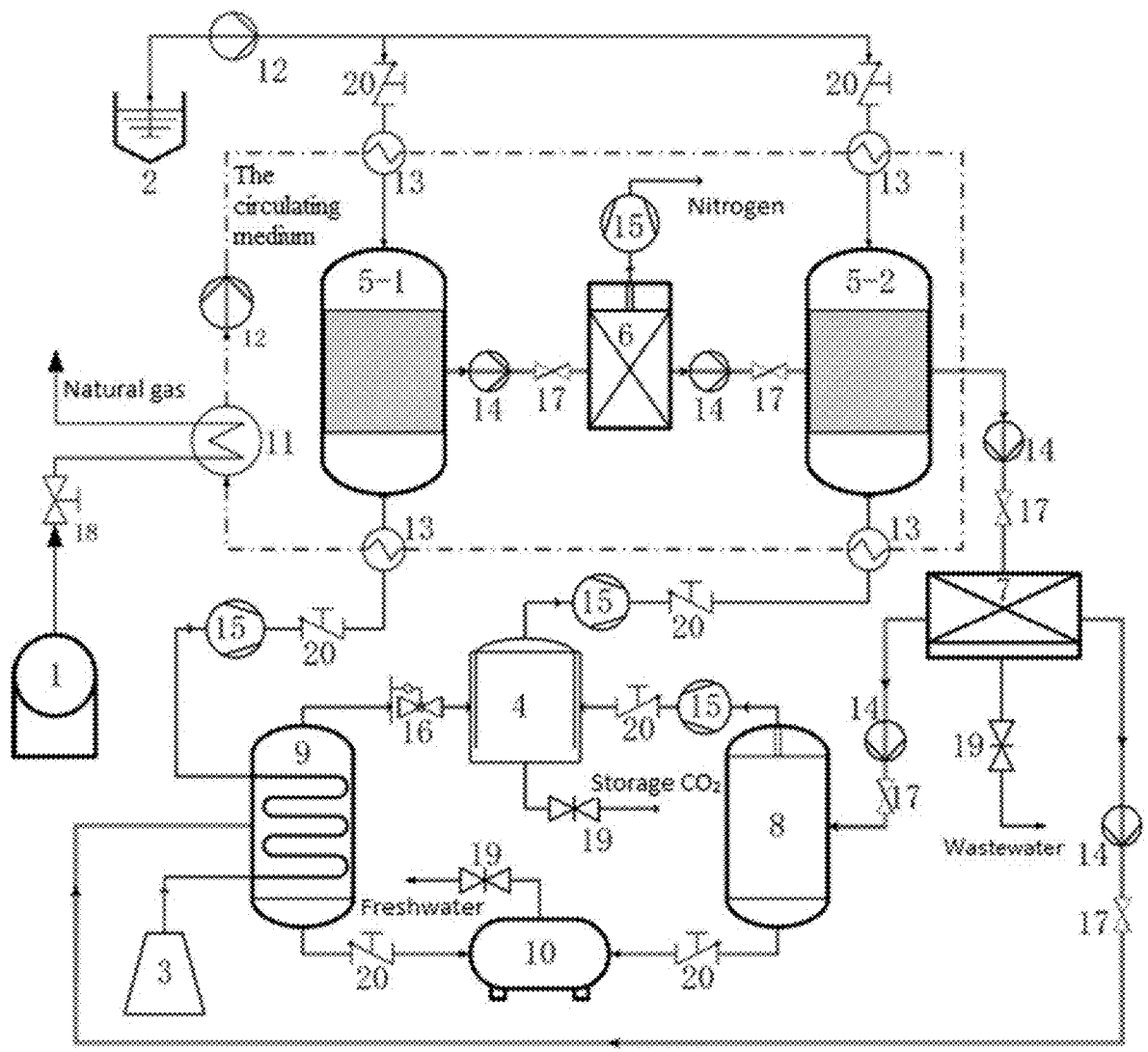
Fig.2(Fig.2 as an illustration in Abstract)

SYSTEM FOR FLUE-GAS HYDRATE-BASED DESALINATION USING LNG COLD ENERGY

TECHNICAL FIELD

The present invention belongs to the research field of hydrate technology application and relates to a system for flue-gas hydrate-based desalination using LNG cold energy.

BACKGROUND

Recently, the freshwater shortage and greenhouse effect have become the two global problems and lots of countries are conducting related researches to solve them. The most prospective technology is the integrated $CO_2$ capture and seawater desalination technology, or rather is the $CO_2$ hydrate-based desalination technology. The principle of this technology is that the seawater can form hydrates with $CO_2$ at a certain low temperature and high pressure (heating, depressurization or their combination will make hydrates decompose). Due to the salt-removing effect during the hydrate formation process, the sodion, magnesium ion, chloridion and other ions cannot enter the hydrate crystals and will still concentrate in the liquid. And then, the freshwater can be collected by decomposing the hydrates alone. At present, in the published patent literatures and research achievements, the production and efficiency of hydrate based desalination technology are limited by the hydrate formation situation. And the more important is that this technology requires so much energy to provide a low-temperature environment for hydrate formation. Yet, the storage temperature of LNG (liquified natural gas) is −162° C. and there are such huge cold energy in LNG storage, transportation and gasification for use that can absolutely be used to the refrigeration for hydrate based desalination. Therefore, the present invention uses the $CO_2$ in the flue-gas (which is about 40° C. and made up of 20% $CO_2$ and 80% $N_2$) to form hydrates with seawater combining the LNG cold energy. And it employs a more simple and effective solution to realize the improvement of freshwater productivity and energy utilization efficiency.

The present invention is to provide a system for flue-gas hydrate-based desalination using LNG cold energy. The purpose of the present invention is to realize the large-scale seawater desalination finally by means of a more convenient and effective solution. It makes good use of LNG cold energy to reduce the cost input. And meanwhile, it captures and storages the $CO_2$ to decrease the $CO_2$ concentration and in the atmosphere and reduces the waste heat emission of the flue-gas.

SUMMARY

The present invention is to provide a system for flue-gas hydrate-based desalination using LNG cold energy. The purpose of the present invention is to achieve the low-cost hydrate-based desalination by means of a more effective solution, realizing the capture of $CO_2$ and the utilization of LNG cold energy at the same time.

The technical solution of the present invention:

A system for flue-gas hydrate-based desalination using LNG cold energy includes a refrigerating system, flue-gas capture system, hydrate formation and separation system, hydrate dissociation system, $CO_2$ circulating system and control system;

The said refrigerating system includes an LNG storage tank 1, gasification chamber 11 and circulating medium. The LNG gasification is endothermic and the gasification amounts of LNG are changed by the opening of a screw valve 18 of the LNG storage tank 1. And the cold energy is transferred to the circulating medium in the gasification chamber 11. The circulating medium is a closed loop by a water-delivery pump 12 and exchanges heat with the seawater and the gas respectively before the formation by more heat exchangers 13. The seawater and gas after the heat exchange are directly to form hydrates.

The said flue-gas capture system includes a flue-gas source 3, heat-exchanged dissociation chamber 9, first-stage formation chamber 5-1 and gas separation chamber 6. The flue-gas source 3 exchanges heat with the hydrates to make them decompose through the heat-exchanged dissociation chamber 9 and then enters the first-stage formation chamber 5-1 by an air pump 15 and check valve 20 successively after the further heat exchange with the circulating medium. The flue-gas forms $CO_2$ hydrates with the seawater in the first-stage formation chamber 5-1. The temperature-hold and pressure-tight residual gas (mainly $N_2$), $CO_2$ hydrates and remnants seawater mixtures go into the gas separation chamber 6 by a multiphase pump 14. The multiphase pump 14 has a butterfly valve 17 which can automatically open or close according to whether the multiphase pump 14 operates or not. The residual gas in the mixtures is separated out of the gas separation chamber 6 by an air pump 15. The left $CO_2$ hydrates and remnants seawater in the gas separation chamber 6 go into a second-stage formation chamber 5-2 immediately by a multiphase pump 14.

The said hydrate formation and separation system includes a second-stage formation chamber 5-2 and liquid separation chamber 7. The $CO_2$ hydrates, that formed in the first-stage formation chamber 5-1 and has exhausted residual gas, rapidly enter the second-stage formation chamber 5-2 by a multiphase pump 14. And then, the formation rate of $CO_2$ hydrates will increase sharply formed from the new seawater and $CO_2$. After the formation, both the massive $CO_2$ hydrates and remnants seawater go into the liquid separation chamber 7 by a multiphase pump 14. The liquid separation chamber 7 separates the remnants seawater from the $CO_2$ hydrates and drains the waste water through a gate valve 19. The remained pure $CO_2$ hydrates go into an exhausting dissociation chamber 8 by a multiphase pump 14 to be decomposed. All the above multiphase pumps 14 are dominated by the control system.

The said hydrate dissociation system collects the freshwater form the decomposed $CO_2$ hydrates in the exhausting dissociation chamber 8 and the heat-exchanged dissociation chamber 9 and deliveries them into a freshwater storage tank 10 for output use. The dissociation pressure of the exhausting dissociation chamber 8 is dominated by an air pump 15 and the dissociation temperature of the heat-exchanged dissociation chamber 9 is decided by the flue-gas source 3.

The said $CO_2$ circulating system collects the exhausted $CO_2$ in the exhausting dissociation chamber 8 and the decomposed $CO_2$ in the heat-exchanged dissociation chamber 9 into a $CO_2$ gas tank 4. The $CO_2$ gas tank 4 provides $CO_2$ gas for the second-stage formation chamber 5-2 to form hydrates. And the redundant $CO_2$ is sequestrated in conventional ways.

The said control system is used to dominate the coordinated operation of the whole system for flue-gas hydrate-based desalination using LNG cold energy. The control system dominates the periodic alternate operation of all parts intelligently. It can dominate and interlock the opening or closing of each valve and the start or stop of each pump as needed. It dominates the temperature of circulating medium by adjusting the LNG amounts into the gasification chamber 11. It dominates the seawater amounts into the two formation chambers according to the actual production requirement and automatically allots the seawater amounts for each formation chamber by the water-delivery pumps 12 and check valves 20. It allots the hydrate amounts for heat-exchanged dissociation chamber 9 according to the thermal capacity of the flue-gas source 3 (the product of gas volume and temperature) and allots other hydrates into the exhausting dissociation chamber 8.

The said system for flue-gas hydrate-based desalination using LNG cold energy can recycle the waste heat of hot flue-gas and separate and capture the contained $CO_2$. And the separated residual $N_2$ and high-concentration seawater can be used in other ways. All parts of the system are resistant to the high-pressure $CO_2$ and high-concentration seawater and have a temperature-hold and pressure-tight function.

The beneficial effects of the present invention are as follows. It realizes the integrated $CO_2$ capture and seawater desalination with a proper structure and a subtle system and solves the cold energy source for hydrate-based desalination by means of using LNG cold energy. It sets two stage formation chambers to solve the capture of $CO_2$ in the flue-gas and guarantee the formation amounts of hydrate. It sets two types of dissociation chambers to decrease the heat emission by using the waste heat of flue-gas and realize the recycling and storage of $CO_2$. The system will not be affected by the changes of seasons and environments and has a strong carrying capacity for the flue-gas source change. It is a system with great application value realistic.

DESCRIPTION OF THE DRAWINGS

FIG. 1 is a system diagram of the present invention.
FIG. 2 is a structure diagram of the present invention.
In the figures: 1 is an LNG storage tank; 2 is a sea basin; 3 is a flue-gas source; 4 is a $CO_2$ gas tank; 5-1 is a first-stage formation chamber; 5-2 is a second-stage formation chamber; 6 is a gas separation chamber; 7 is a liquid separation chamber; 8 is an exhausting dissociation chamber; 9 is a heat-exchanged dissociation chamber; 10 is a freshwater storage tank; 11 is a gasification chamber; 12 is a water-delivery pump; 13 is a heat exchanger; 14 is a multiphase pump; 15 is an air pump; 16 is a relief valve; 17 is a butterfly valve; 18 is a screw valve; 19 is a gate valve; 20 is a check valve.

DETAILED DESCRIPTION

Following is the detailed description of the specific embodiment of the present invention combining the technical solution and accompanying drawings.

According to the principle shown in FIG. 1, the structures of the system are connected as shown in FIG. 2 and the system is used to conduct the flue-gas hydrate-based desalination using LNG cold energy with the following steps:

The control system starts the water-delivery pump 12 of circulating medium. In the meantime, it sets the temperature of circulating medium and gives the opening commands to the screw valve 18 of the LNG storage tank 1 to adjust the LNG amounts entering the gasification chamber 11 and to make the circulating medium reach and keep the setting temperature.

The flue-gas enters the heat-exchanged dissociation chamber 9 for heat exchange with the hydrates which wait for decomposing by heating, and then enters the first-stage formation chamber 5-1 after flowing through the heat exchanger 13 by the air pump 15 to be precooled by the circulating medium. At the same time, the seawater inpours into the first-stage formation chamber 5-1 by the water-delivery pump 12 and forms $CO_2$ hydrates with the $CO_2$ of the flue-gas. The residual gas, remnants seawater and $CO_2$ hydrates mixtures after the formation are fed into the gas separation chamber 6 by the multiphase pump 14. The gas after the formation of $CO_2$ hydrates, which is mainly $N_2$, is separated out of the mixtures by the gas separation chamber 6. And the left $CO_2$ hydrates and seawater are continued to be pumped into the second-stage formation chamber 5-2 by the multiphase pump 14.

The source of the seawater into the second-stage formation chamber 5-2 is the same as the first-stage. While the gas is supplied by the $CO_2$ gas tank 4 and the $CO_2$ are pumped into the second-stage formation chamber 5-2 by the air pump 15. Both the seawater and the $CO_2$ exchange heat with the circulating medium to be precooled. Next, the remnants seawater and $CO_2$ hydrates mixtures are pumped into the liquid separation chamber 7 by the multiphase pump 14. And the remnants waste seawater is separated by the liquid separation chamber 7 and is discharged through the gate valve 19. The $CO_2$ hydrates enter the exhausting dissociation chamber 8 and the heat-exchanged dissociation chamber 9 by the multiphase pumps 14 respectively. And the $CO_2$ hydrate amounts into the two dissociation chambers are allotted by the control system according to the flue-gas source 3.

The exhausting dissociation chamber 8 makes the $CO_2$ hydrates decompose by means of depressurization. The decomposed freshwater flows into the freshwater storage tank 10 by the check valve 20. The dissociation pressure is controlled by the air pump 15. And the $CO_2$ gas is delivered into the $CO_2$ gas tank 4 through the check valve 20 to ensure the continuous dissociation of $CO_2$ hydrates. The heat-exchanged dissociation chamber 9 makes the $CO_2$ hydrates decompose by means of warming and the decomposed freshwater flows into the freshwater storage tank 10 by the check valve 20. The dissociation temperature is attained by the heat exchange with the hot flue-gas source 3. And the decomposed $CO_2$ gas enters the $CO_2$ gas tank 4 through the relief valve 16. The $CO_2$ stored in the $CO_2$ gas tank 4 are mainly used for the hydrate formation of the second-stage formation chamber 5-2. And the redundant $CO_2$ are sequestrated in conventional ways.

Above is just a basic description of the present invention and the related system for flue-gas hydrate based desalination using LNG cold energy is not limited by the structures and steps in the above embodiments. Based on the said system for flue-gas hydrate based desalination using LNG cold energy, it is possible for those skilled in this art to design a similar system or use the partial function independently or the overall function in conjunction. These are all the equivalent transformation or utilization according to the technical solutions of the present invention and they shall fall within the protection scope of the present invention.

We claim:

1. A system for flue-gas hydrate-based desalination using LNG (liquefied natural gas) cold energy, wherein the system for flue-gas hydrate-based desalination comprising
   a refrigerating system,
   a flue-gas capture system,
   a hydrate formation and separation system, a hydrate dissociation system,
a $CO_2$ circulating system, and
a control system;

the said refrigerating system comprising an LNG storage tank, gasification chamber and circulating medium, the LNG gasification is endothermic and the gasification amounts of LNG are changed by the opening of a screw valve of the LNG storage tank, the cold energy is transferred to the circulating medium in the gasification chamber, the circulating medium is a closed loop by a water-delivery pump and exchanging heat with seawater and gas respectively before the formation by more heat exchangers, the seawater and gas after the heat exchange are directly to form hydrates;

the said flue-gas capture system comprising a flue-gas source, heat-exchanged dissociation chamber, first-stage formation chamber and gas separation chamber, the flue-gas source exchanging heat with the hydrates to make them decompose through the heat-exchanged dissociation chamber and then entering the first-stage formation chamber by an air pump and check valve successively after the further heat exchange with the circulating medium, the flue-gas forming $CO_2$ hydrates with the seawater in the first-stage formation chamber, the temperature-hold and pressure-tight residual gas, $CO_2$ hydrates and remnants seawater mixtures going into the gas separation chamber by a multiphase pump, the multiphase pump having a butterfly valve which can automatically open or close according to whether the multiphase pump operates or not, the residual gas in the mixtures is separated out of the gas separation chamber by a second air pump, the left $CO_2$ hydrates and remnants seawater in the gas separation chamber going into a second-stage formation chamber immediately by a second multiphase pump;

the said hydrate formation and separation system comprising the second-stage formation chamber and a liquid separation chamber, the $CO_2$ hydrates that formed in the first-stage formation chamber and has exhausted residual gas rapidly entering the second-stage formation chamber by a third multiphase pump, the formation rate of $CO_2$ hydrates will increase sharply formed from the new seawater and $CO_2$, both the massive $CO_2$ hydrates and remnants seawater after the formation going into the liquid separation chamber by the third multiphase pump, the liquid separation chamber separating the remnants seawater from the $CO_2$ hydrates and draining the waste water through a gate valve, the remained pure $CO_2$ hydrates going into an exhausting dissociation chamber by a fourth multiphase pump to be decomposed, all the above multiphase pumps are controlled by the control system;

the said hydrate dissociation system collecting a freshwater from the decomposed $CO_2$ hydrates in the exhausting dissociation chamber and the heat-exchanged dissociation chamber and delivering them into a freshwater storage tank for output use, the dissociation pressure of the exhausting dissociation chamber is controlled by a third air pump and the dissociation temperature of the heat-exchanged dissociation chamber is decided by the flue-gas source;

the said $CO_2$ circulating system collecting the exhausted $CO_2$ in the exhausting dissociation chamber and the decomposed $CO_2$ in the heat-exchanged dissociation chamber into a $CO_2$ gas tank, the $CO_2$ gas tank providing $CO_2$ gas for the second-stage formation chamber to form hydrates, the redundant $CO_2$ is sequestrated in conventional ways;

the said control system is used to control the coordinated operation of the whole system for flue-gas hydrate-based desalination using LNG cold energy, the control system controlling the periodic alternate operation of all parts intelligently, it can control and interlock the opening or closing of each valve and the start or stop of each pump as needed, it controlling the temperature of circulating medium by adjusting the LNG amounts into the gasification chamber, it controlling the seawater amounts into the two formation chambers according to the actual production requirement and automatically allotting the seawater amounts for each formation chamber from a sea basin by a second water-delivery pump and two check valves connected to it, it allotting the hydrate amounts for the heat-exchanged dissociation chamber according to the thermal capacity of the flue-gas source and allots other hydrates into the exhausting dissociation chamber.

\* \* \* \* \*